C. W. MITCHELL.
TESTING LAMP AND FUSE TESTING DEVICE.
APPLICATION FILED MAY 8, 1912.
1,109,450.
Patented Sept. 1, 1914.
2 SHEETS—SHEET 1.
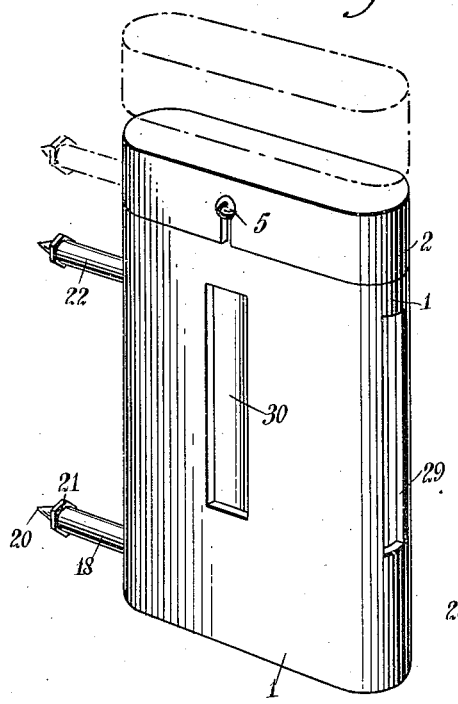
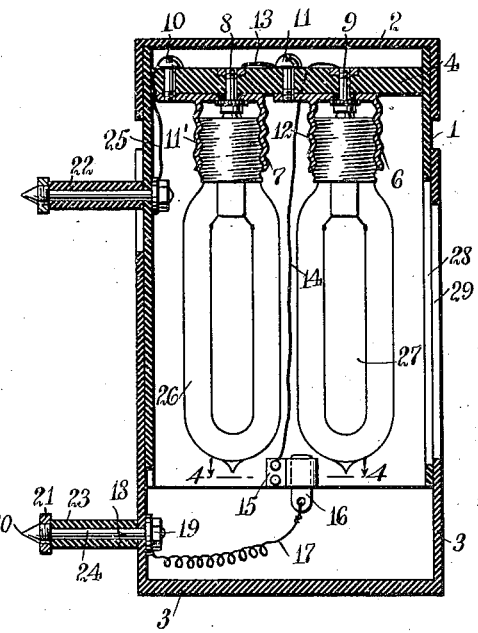
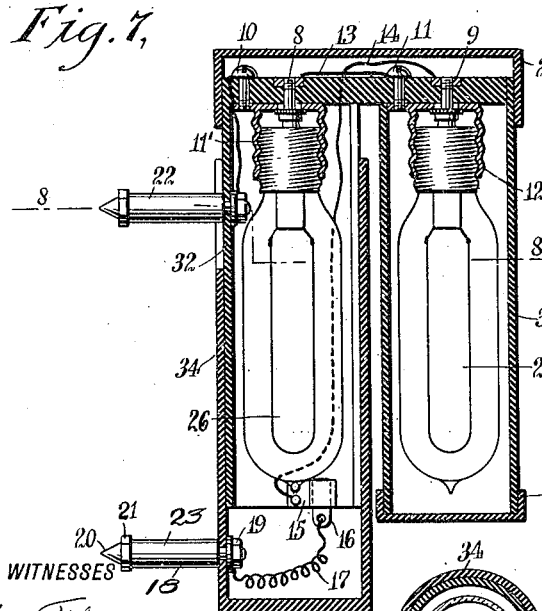
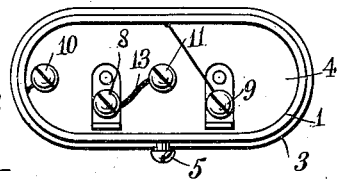
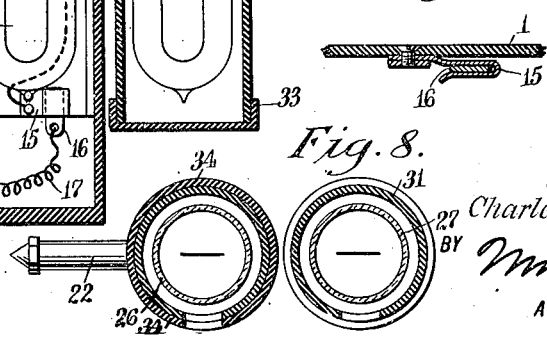
WITNESSES
Edw. Thorpe
A. L. Kitchin
INVENTOR
Charles W. Mitchell
BY
Munn & Co
ATTORNEYS

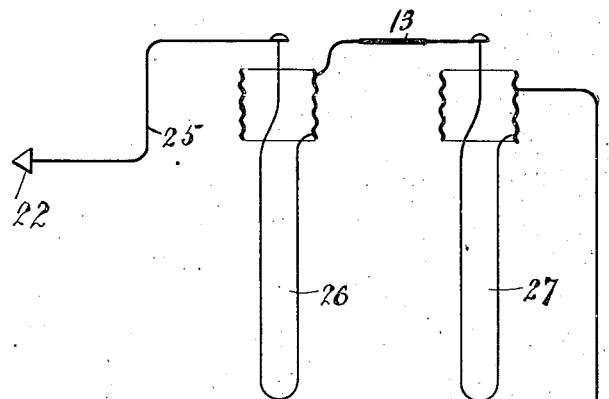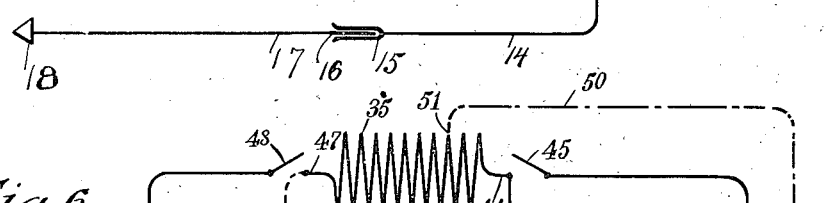

UNITED STATES PATENT OFFICE.

CHARLES W. MITCHELL, OF NEW YORK, N. Y., ASSIGNOR OF ONE-HALF TO CHARLES W. LANSING, OF BROOKLYN, NEW YORK.

TESTING-LAMP AND FUSE-TESTING DEVICE.

1,109,450.  Specification of Letters Patent.  Patented Sept. 1, 1914.

Application filed May 8, 1912. Serial No. 695,859.

*To all whom it may concern:*

Be it known that I, CHARLES W. MITCHELL, a citizen of the United States, and a resident of the city of New York, borough of Brooklyn, in the county of Kings and State of New York, have invented a new and Improved Testing-Lamp and Fuse-Testing Device, of which the following is a full, clear, and exact description.

This invention relates to improvements in testing devices, and has for an object to provide an improved testing construction which may be adjusted or re-arranged to accommodate varying circumstances, and for testing conductors of electric circuits under varying conditions.

Another object of the invention is to provide an improved testing structure which may at one time be used in series with a circuit and at another time in multiple series.

A still further object of the invention is the provision of a testing device arranged with lamps and connecting means therefor terminating in contact members, these structures, except the contact members, being inclosed in a telescoping housing, one of the contact members being connected to one part of the housing and the other of the contact members being connected to the other part of the housing, so that the contact members may be adjusted for engaging conductors spaced apart within predetermined limits.

In carrying out the objects of the invention, a housing, or a pair of housings if desired, are arranged to accommodate a plurality of lamps of a standard voltage. This housing is provided with a telescoping cap or cover which covers and protects the lamps but does not in any way interfere with the movement of the contacts carried thereby. In fact the telescoping cover is designed to permit the adjustment of one of the contacts of the testing lamps, the other contact being mounted stationary on the housing. The lamps are connected together in series with one terminal connected to the stationary contact and the opposite terminal connected to the movable contact, whereby the contacts may be adjusted for engaging conductors positioned various distances apart. By removing the fuse which connects the two lamps in the housing and substituting suitable wiring connected with the lamps, the lamps may be connected in multiple series with any circuit or electrical conductor for testing the same.

A practical embodiment of the invention is represented in the accompanying drawings forming a part of this specification, in which similar characters of reference indicate corresponding parts in all the views.

Figure 1 is a perspective view of an embodiment of the invention; Fig. 2 is a longitudinal vertical section through the structure shown in Fig. 1; Fig. 3 is a bottom plan view of the structure shown in Fig. 2, the bottom cover being removed; Fig. 4 is a fragmentary sectional view on the line 4—4 of Fig. 2, the same being shown on a slightly enlarged scale; Fig. 5 is a diagram showing the wiring of the device shown in Figs. 1 and 2; Fig. 6 is a diagram showing the device connected in multiple series to a coil which is being tested; Fig. 7 is a sectional view similar to Fig. 2 except that the same shows a slightly modified form of the invention; and Fig. 8 is a section through Fig. 7 substantially on the line 8—8, certain parts being removed.

Referring to the accompanying drawings by numerals, 1 indicates a housing provided with a bottom cover 2 and a telescoping cap 3. A plate 4 is positioned near the bottom of the housing 1, which is held in place by any suitable means, as for instance screws. The housing 1, cover 2, cap 3, and plate 4 are all preferably made from insulating material, as for instance fiber. The bottom cover 2 is freely removable but is normally held in position by a screw 5 which clamps the cover firmly to the housing 1. Arranged in the housing 1 are a pair of sockets 6 and 7, held in place by suitable screws 8 and 9, and also by screws 10 and 11, the screws 8 and 9 being insulated from the sleeves 11' and 12 of the sockets 6 and 7. The screw 11 is connected to screw 8 by a suitable fuse 13. Connected with the screw 9 is a conductor 14 which is in turn connected to a switch socket 15 designed to receive a knife 16. Connected to the knife 16 is a conductor 17 which is also connected by a suitable nut to the contact 18. The nut 19 which connects the conductor 17 to the contact 18 not only accomplishes this function, but also clamps the contact 18 firmly to the cap 3 so that the contact will be moved back and forth as the cap is adjusted. The contact 18 is provided with a contact point 20 which is threaded at its lower part for accommodatng a nut 21. The nut 21 is adapted to receive a conductor when the space between contacts 18 and 22 is too great to be spanned by the device in the position shown in Figs. 1 and 2. An insulating sleeve 23 is provided which surrounds the shaft 24 and prevents any accidental engagement with the metallic part of the contact. The contact 22 is formed in a similar manner to the contact 18 and will therefore need no additional description. The contact 22 is connected by a conductor 25 to the screw 10.

When the various devices are connected up as just described, and the contacts 22 and 18 are in engagement with opposite sides of a circuit in which current is flowing, part of the current will pass for instance through contact 22, wire 25, screw 10, the shell or sleeve 11', lamp 26, screw 8, fuse 13, screw 11, sleeve or shell 12, lamp 27, screw 9, conductor 14, switch socket 15, and knife 16, conductor 17, to contact 18, and from thence back to the source of supply. In order to properly observe the lamps 26 and 27, the housing 1 is provided with an aperture 28 which is adapted to register with an aperture 29 in the cap 3. A similar opening 30 is provided substantially centrally of the side of the device so as to observe the action of both lamps simultaneously. This is very desirable where the device is connected up in multiple series, as in this case one lamp may light and the other lamp may remain unlighted. It will be evident that the cap 3 may be easily removed whenever desired by a longitudinal movement thereof. If the cap 3 is completely removed the knife 16 may be easily pulled out of its socket 15 so that in removing the cap no injury will be done and the device may be re-assembled without any connecting of wires or other operations except the placing of the knife 16 in its socket 15.

In Figs. 7 and 8 will be seen a slightly modified form of the invention, in which the housing 31 and 32 are provided formed so as to independently inclose the lamps 26 and 27. These housing are preferably cylindrical instead of substantially oblong in cross section, as shown in Figs. 1 and 2. When the device is constructed according to Fig. 7 the bottom cover 2 is preferably maintained in its usual form and the housing 31 provided with a cap 33 which may be easily removed and again applied but acts only in the capacity of a cover. However the housing 32 is provided with a cap 34 which is intended to act not only as a cap, but as an extension member for the contact 18 in a similar manner to the cap 3. Aside from the shape of the cap 34 and the fact that the same surrounds only the housing 32, the construction and operation is the same as cap 3 and therefore will need no additional description. This construction is designed to cheapen and somewhat simplify the device.

Referring to Figs. 3 and 6, an arrangement of the device is presented which permits the connection of the device in series to an electrical instrument indicated 35. When the arrangement shown in Fig. 6 is designed to be used connecting wires 42, 43, 46, and 49 are connected to the screws 8 to 11 inclusive, and the fuse 13 is removed. The coil 35 is connected by wires 36 and 37 to a switch 38 in the usual manner. The switch 38 is connected at 39 and 40 to an ordinary three wire system which has the usual neutral wire grounded at 41. A wire 42 is provided which extends from screw 11 to one side of the switch 38 and a wire 43 is connected with screw 9 and extends to the point 44 which is at one of the terminals of the coil 35, the wire 37 being disconnected and moved to one side so that any current flowing from a source of supply from the switch must pass through lamp 27. The lamp 26 has a wire 46 connected with the screw 8 and to the terminal 47 of the coil 35, the wire 36 being disconnected and moved to one side, as shown in dotted lines at 48. The screw 10 has connected therewith a wire 49 which is also connected to the switch 38 on the side opposite wire 42. After these connections have been made the current is turned on by closing the switch 38 and if the coil 35 is grounded, both of the lamps will be lighted. Under these conditions, if the coil 35 is grounded as indicated by wire 50, current will flow from the switch 38 through lamp 27, through part of the coil 35, and from thence to the ground through wire 50. The current will also flow at the same time from the switch 38 through wire 49, lamp 26, wire 46, and part of the coil 35, and from thence to the ground through wire 50. In this way the fact that the coil 35 is grounded is ascertained, but the exact point of grounding is not known, but this may be found in the usual manner at the repair shop or by an examination of the coil.

It is evident of course that the testing device embodying the invention is designed to test an electrical conductor of any kind provided the same is disconnected from other sources of wiring. It may be used for testing for a closed circuit, an open circuit, or a ground, the illustration merely showing the way the device is connected up for testing for a ground.

Having thus described my invention I claim as new and desire to secure by Letters Patent:—

1. In a testing device of the class described, the combination with a housing, a signal device arranged in the housing, a contact member arranged in the housing, means for connecting one side of said signal device to said contact, a telescoping cover for said housing, and a contact connected with said telescoping cover, of a flexible wire connecting said contact with the opposite side of said signal devices to said first mentioned contact, the telescoping cover permitting the ready adjustment of the distance between said contacts, and said flexible means maintaining a continuous circuit.

2. In a device of the character described, the combination with a housing, lamps positioned in said housing, means for connecting the lamps in series, a contact member connected with one side of said lamps and carried by said housing, a telescoping cap for said housing and a contact carried thereby, of means for connecting said last mentioned contact with said lamp adapted to permit a free reciprocation of said cap for permitting a variation of the distance between said contacts, said means including a socket rigidly secured to said housing, a knife removably fitting into said socket, and a flexible conductor connecting said knife and the contact mounted on said cap.

3. In a testing device of the character described, a pair of lamps, a base for supporting said lamps, side by side, a housing secured to said base formed with a window in a plane between said lamps, a telescoping cap fitting over said housing formed with a window registering with the window in said housing, a contact member secured to said housing, means for connecting one side of said lamps to said contact member, a contact member secured to said cap, flexible means connecting said last mentioned contact with said lamps, said flexible means permitting a back and forth movement of said cap without breaking the circuit, and said windows in said cap and said housing permitting a view simultaneously of both of said lamps.

4. In a testing device of the character described, a pair of lamps, means for connecting the same in series, a housing for inclosing said lamps, a contact member secured to said housing, means for connecting said contact member with one side of said lamps, said housing being formed with a window, a cap formed with a window and a slot, said cap fitting over said housing and adapted to be moved longitudinally thereof, said slot accommodating said contact member and said window co-acting with the window in said housing for disclosing to view said lamps, a contact member mounted on said cap, and a flexible wire for connecting said contact member with said lamps regardless of the position of the contact member.

5. In a testing device of the character described, a pair of lamps, a socket for each lamp, a housing for said lamps, a base member for supporting said sockets spaced from the end of said housing whereby a large and small compartment is provided, said lamps occupying said large compartment, clamping means extending through said base member from said smaller compartment and engaging said sockets for holding the same in position, said clamping members acting as terminals for the opposite sides of each of said lamps, a cover for the end of said housing carrying said base member, a fuse connecting some of said clamping members for connecting the lamps in series, a contact member rigidly secured to said housing, means for connecting said contact member with one of said clamping members, a socket secured to the housing at the upper end thereof, means for flexibly connecting said socket with one of the terminals of said lamps whereby current entering said contact member must pass through both of said lamps and said socket, a telescoping cover for said housing, a contact member rigidly connected with said telescoping cover, a knife removably engaging said socket, and means for connecting said knife and the contact member carried by said cap, said means being flexible and adapted to permit a longitudinal back and forth movement of said cap without causing the withdrawal of said knife from said socket.

In testimony whereof I have signed my name to this specification in the presence of two subscribing witnesses.

CHARLES W. MITCHELL.

Witnesses:
  A. L. KITCHIN,
  CHARLES W. LANSING.